United States Patent [19]

Cook et al.

[11] Patent Number: 4,816,735
[45] Date of Patent: Mar. 28, 1989

[54] BATTERY CHARGER

[75] Inventors: William H. Cook, Fairport; Randall J. Thorne, Penfield, both of N.Y.

[73] Assignee: Eastman Kodak Company, Rochester, N.Y.

[21] Appl. No.: 83,328

[22] Filed: Aug. 10, 1987

[51] Int. Cl.⁴ .................... H02J 7/00; H01M 10/46
[52] U.S. Cl. ........................................ 320/2; 320/15
[58] Field of Search .............................. 320/2-5, 320/15

[56] References Cited

U.S. PATENT DOCUMENTS

| | | | |
|---|---|---|---|
| 3,391,321 | 7/1968 | Ota | 320/2 |
| 3,579,075 | 5/1971 | Floyd | 320/2 |
| 3,959,706 | 5/1976 | Mabuchi et al. | 320/2 |
| 4,229,686 | 10/1980 | Mullersman et al. | 320/2 |
| 4,232,260 | 11/1980 | Lambkin | 320/2 |
| 4,342,954 | 8/1982 | Griffith | 320/14 |
| 4,403,182 | 9/1983 | Yeh | 320/2 |
| 4,602,203 | 7/1986 | Bragdon | 320/2 |
| 4,629,962 | 12/1986 | Arakawa | 320/2 |
| 4,645,996 | 2/1987 | Toops | 320/3 X |

Primary Examiner—R. J. Hickey
Attorney, Agent, or Firm—Donald D. Schaper

[57] ABSTRACT

A battery charger is disclosed which is adapted to receive batteries of different sizes for charging. The charger comprises a separate support for each of the batteries, and different sizes of batteries are supported at different levels in the charger. A charge current is supplied to the batteries by a circuit which includes a timer for regulating the charge time. In order to insure that only batteries having known electrical characteristics are mounted in the charger, means are provided to lock out batteries not having a predetermined feature, for example, a positive terminal of a particular size. The charging time is regulated in accordance with the size of the battery, and a detector is provided to sense the size of batteries in the charger.

7 Claims, 4 Drawing Sheets

BATTERY CHARGER

BACKGROUND OF THE INVENTION

1. Field of the Invention

The present invention relates to a battery charger, and more particularly, to such a charger which is adapted to charge batteries of more than one size.

2. State of the Prior Art

An increasing number of battery-operated devices are being offered for sale which can be powered by primary cells (dry cells) or by rechargeable secondary cells. Due to the cost of replacement cells, many consumers elect to use secondary cells and to recharge the cells in a relatively-inexpensive battery charger. However, because of the different sizes of batteries and the different electrical characteristics of the batteries, it is not practical to provide a single charger which is suitable for all types of batteries.

U.S. Pat. No. 3,579,075, discloses a compact battery charger for recharging batteries of different sizes and different electrical characteristics. The battery charger comprises a housing which includes battery retaining recesses which are sized for a particular size of battery and contacts which are adapted to connect each size of battery with an appropriate charging circuit. A disadvantage of this arrangement is that a different charging circuit is used with each size of battery. Further, there is no provision for discriminating between different types of batteries of the same size. Thus, certain types of batteries will not receive the optimum charge, and some types of batteries may even be damaged by the charger.

SUMMARY OF THE INVENTION

It is the object of the present invention to overcome the problems in the prior art and to provide a battery charger which is particularly suited to charge batteries of a predetermined type.

In accordance with one aspect of the present invention, there is provided a battery charger for charging a battery having a predetermined feature indicative of electrical characteristics of the battery, the charger comprising: support means for receiving the battery in the charger; circuit means for supplying a current to the battery; contact means for connecting the battery to the circuit means; and means in the charger for preventing batteries not having the predetermined feature from being electrically connected to the contact means.

In one embodiment of the present invention, the battery charger is formed with a housing which contains a plurality of battery supports each of which is adapted to receive only batteries of certain sizes. A detector provides a signal to the charger circuit when relatively small batteries are in the charger, and the charger circuit provides a current to the batteries for a length of time which is dependent on the size of batteries in the charger. Contact means in each of the battery support locations are adapted to receive only batteries having contacts of a predetermined type. In one embodiment, keyways associated with the positive contacts of the charger are formed to receive positive terminals up to a predetermined size and to exclude batteries having larger positive terminals. In a second embodiment, the charger cannot be electrically connected to batteries not having an indentation in the negative terminal.

A main advantage of the present invention is that batteries of different sizes can be charged in the charger, and the proper amount of charge is applied to each of the batteries. Batteries which do not have electrical characteristics compatible with the capabilities of the charger are not accepted in the charger.

Other features and advantages will become apparent with reference to the following Description of the Preferred Embodiment when read in light of the attached drawings.

DESCRIPTION OF THE PREFERRED EMBODIMENT

Figure 1:
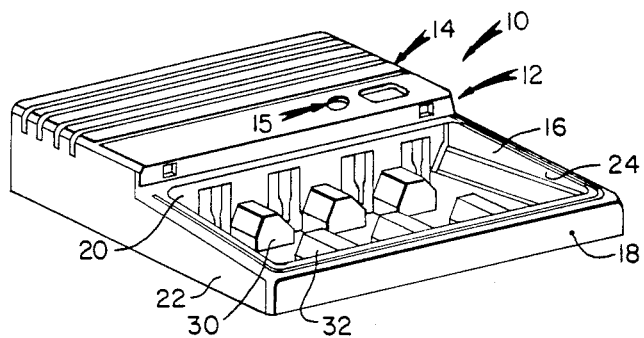
FIG. 1 is a perspective view of the battery charger of the present invention.

With reference to FIG. 1, there is shown a battery charger 10 constructed in accordance with the present invention. Battery charger 10 comprises a housing 12 which can be constructed from, for example, molded plastic. Housing 12 includes an enclosure 14 for receiving electrical elements of the charger (see FIG. 9) and a cavity 16 for receiving batteries to be charged. A light-emitting diode 15 is adapted to indicate when the charger 10 is turned on, and a hinged cover (not shown) can be mounted over cavity 16.

Figure 2:
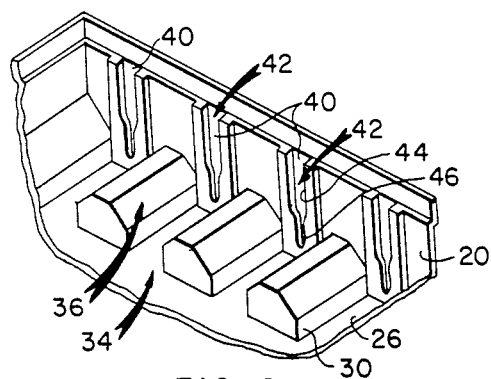
FIG. 2 is a fragmentary perspective view showing the battery supports and the positive contacts of the charger.
Figure 3:
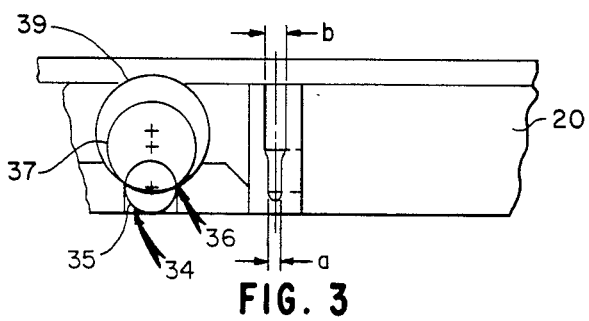
FIG. 3 is a fragmentary elevational view of the battery supports and three different sizes of batteries in the supports.

Cavity 16 is defined by a front wall 18, a rear wall 20, end walls 22, 24, and a floor 26. As shown in FIGS. 1 and 2, three elongated elements 30 are mounted on floor 26 adjacent rear wall 20 and three elongated elements 32 are mounted on floor 26 adjacent front wall 18. Elements 30 and 32 are arranged to form a support means for batteries in charger 10 which includes four supports 34 for small batteries, for example AA size batteries, and four supports 36 for larger batteries, for example C or D size batteries. In FIG. 3, there is shown an AA size battery 35 in a support 34, a size C battery 37 in support 36, and a size D battery 39 in support 36. It will be apparent that only four batteries can be loaded in charger 10 at any one time.

Figure 4:
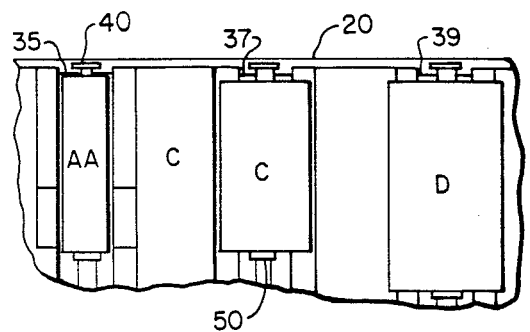
FIG. 4 is a fragmentary plan view of the charger showing three different sizes of batteries connected to the positive contacts of the charger.
Figure 5:
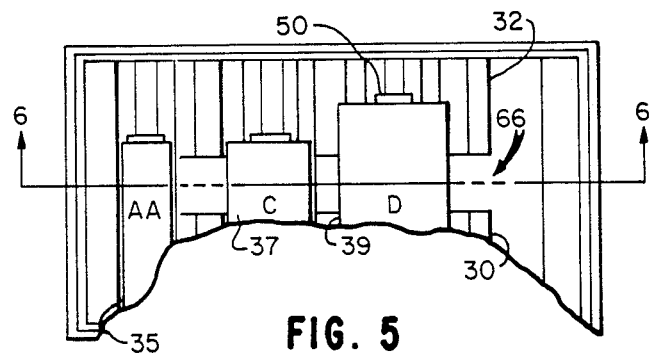
FIG. 5 is a fragmentary plan view of the charger showing three different sizes of batteries connected to the negative contacts of the charger.

Four positive contacts 40 extend through wall 20 as shown in FIGS. 2 and 4. Surrounding each of the contacts 40 are keyways 42 which serve to limit the size of positive battery contact which can be brought into engagement with contacts 40. Each of the keyways 42 has a first portion 44 which is adapted to function with positive contacts of C and D size batteries 37, 39, and a second portion 46 which is adapted to function with positive contacts of AA size batteries 35.

In order to insure that only batteries having desired electrical characteristics are inserted in charger 10, the portion 44 of a keyway 42 is sized to exclude all C and D size batteries which have a positive contact larger than a predetermined diameter; and portion 46 of keyway 42 is sized to exclude all AA size batteries having a positive contact larger than a predetermined diameter. For example, the positive contact diameter for conventional AA size batteries is 0.171 inches, and the width "a" of portion 46 (FIG. 3) is 0.150 inches. Similarly, the positive contact diameter of a conventional C size battery is 0.25 inches and of a conventional D size battery is 0.343 inches, and the width "b" of portion 44 in charger 10 is 0.240 inches.

Figure 7:
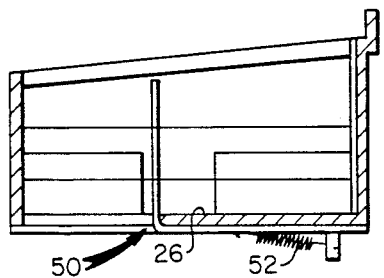
FIG. 7 is an side elevational view of the charger, with parts shown in section, showing a by-pass switch.
Figure 8:
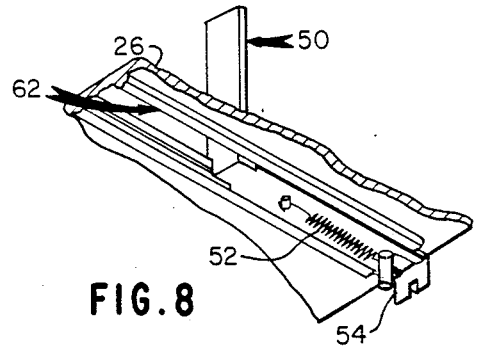
FIG. 8 is a perspective view showing the by-pass switch.

The batteries in charger 10 are biased against positive contacts 40 by means of slidably-mounted negative contacts 50 (FIGS. 7 and 8). Each contact 50 is mounted in a track 62 in floor 26, and the contact 50 is biased toward wall 20 by a spring 52. When no battery is in one of the supports 34 or 36, the contact 50 is biased against an end portion 54 of positive contact 40. As will be apparent from the discussion which follows of charger circuit 70 (FIG. 9), the engagement of a contact 50 with an end portion 54 shorts out a portion of the charger circuit, and thus, contact 50, end portion 54, and spring 52 function as a by-pass switch.

Figure 6:
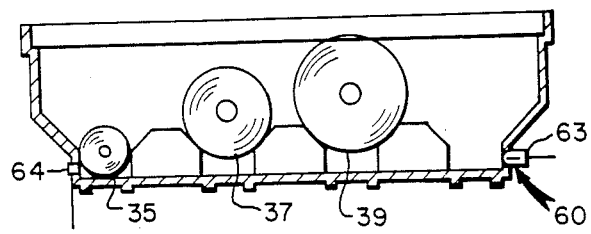
FIG. 6 is a sectional view taken on line 6—6 in FIG. 5.

As shown in FIG. 6, a battery size detector 60 is mounted in housing 12 to sense whether any AA size batteries 35 are in the charger 10. The signals from detector 60 are used to regulate the charge interval in a manner which will be explained in the discussion of charger circuit 70. Detector 60 comprises an infrared LED 63 and an infrared phototransistor 64. Radiation from LED 63 is sensed by phototransistor 64 if no AA size battery 35 is in a support 34. The radiation from LED 63 travels along a channel 66 between elements 30 and 32.

Figure 9:
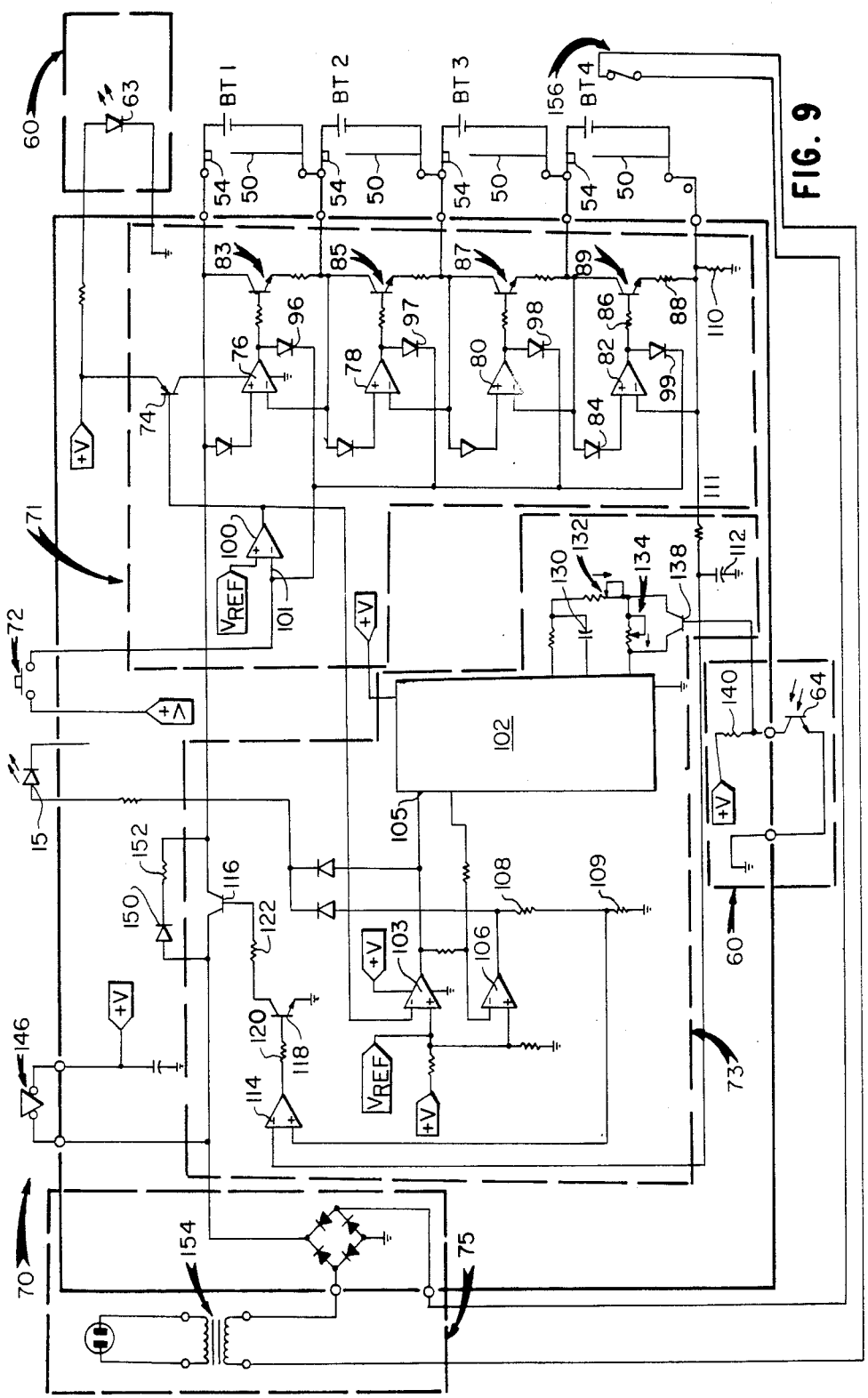
FIG. 9 is schematic diagram of the charger circuit.

Charger circuit 70, as shown in FIG. 9, comprises a battery discharge circuit 71, the battery size detector 60, a charge control circuit 73, and a power supply 75. In the operation of charger circuit 70, a momentary switch 72 is closed to start a discharge cycle. When switch 72 is closed, a transistor 74 is turned on. Transistor 74 supplies power to comparators 76, 78, 80, and 82, in circuits 83, 85, 87, and 89, respectively. Circuits 83, 85, 87, and 89, are adapted to function with batteries Bt1-Bt4 respectively, each of the batteries being supported in one the battery charging positions in charger 10. Contacts 50 and end portions 54 of positive contacts 40 are shown schematically in FIG. 9; as noted above, when no battery is in a particular position, a contact 50 engages an end portion 54 to short out the circuit for that position.

With reference to circuit 89, if the voltage from battery Bt4 is higher than the threshold voltage of a diode 84, the output from comparator 82 will be high. A high output from comparator 82 will cause a transistor 86 to conduct and battery 89 will discharge current through transistor 86 and a resistor 88. When battery 89 is sufficiently discharged, causing the voltage difference between the inputs to comparator 82 to reach 0 volts, the output from comparator 82 becomes low and transistor 86 turns off; when transistor 86 turns off, the discharge of battery 89 is stopped. Circuits 83, 85, and 87 operate in the manner just described for circuit 89 to discharge batteries Bt1, Bt2, and Bt3. Diodes 96, 97, 98, and 99 combine to function as an OR gate which is connected to comparator 100. The output of comparator 100 will remain low as long as input 101 is greater than the reference voltage designated by $V_{REF}$. When the outputs of comparators 76, 78, 80, and 82 are simultaneously low, transistor 74 will be turned off, thereby removing power from the comparators and terminating the discharge cycle.

When the discharge cycle has been completed, the output from comparator 100 becomes high; when comparator 100 goes high, comparator 103 goes low which triggers timer circuit 102 through input 105 to start a charge cycle. When the timer circuit 102 is triggered, comparator 106 becomes high and applies a voltage across divider resistors 108 and 109. The voltage across resistor 110 is proportional to the instantaneous charge current, and resistor 111 and capacitor 112 form a low-pass filter in which the voltage across capacitor 112 is proportional to the average charge current. Comparator 114, transistors 116, 118, resistors 120, 122, 110, 108, 109, form a constant current regulator in which the active impedance of transistor 116 will vary to maintain a constant average charge current through batteries Bt1-Bt4.

Timer circuit 102 controls the charge cycle interval which is proportional to the sizes of capacitor 130 and resistors 132 and 134. Phototransistor 64, a transistor 138, LED 63, and a resistor 140, form a charge interval selection circuit in which obstruction of the illumination of phototransistor 64 by LED 63 will turn on transistor 138, effectively short-circuiting resistor 134 and thereby affecting the charge interval. Phototransistor 64 and LED 63 are positioned in charger housing 10, as shown in FIG. 6, such that AA size batteries 35 obstruct the light path between phototransistor 63 and LED 64, and C and D size batteries 37, 39, do not obstruct the light path. When AA size batteries 35 are detected, the charge interval is shorter than when only C and D size batteries 37, 39, are being charged. At the end of the charge cycle, as determined by timer circuit 102, transistor 116 turns off. A diode 150 and resistor 152 provide a trickle current which charges batteries Bt1-Bt4 as long as power is applied to a transformer 154 in power supply A.

An LED 15 (FIGS. 1 and 9) is on during both the battery discharge and charge cycles. An interlock switch 146 is opened when a charger housing cover (not shown) is opened, removing power from the charger circuit 70. A thermostat 156 interrupts power in the circuit 70 in the event battery temperature exceeds a predetermined value.

Figure 10:
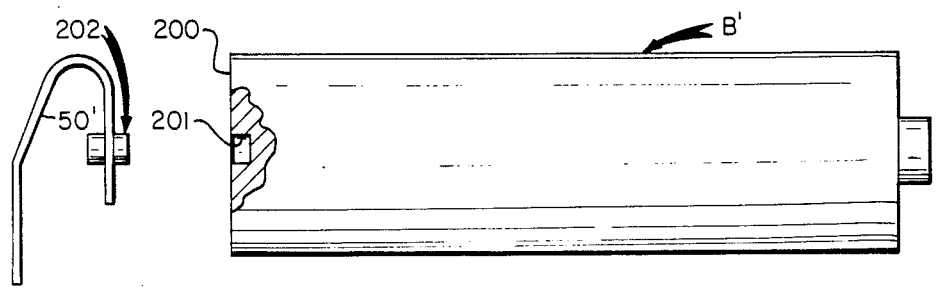
FIG. 10 is a side elevational view, with parts shown in section, of a battery and a negative contact of a second embodiment of the battery charger.

It will be apparent to those skilled in the art that other means can be used to exclude batteries from charger 10. One example is a second embodiment of Applicants' invention, shown in FIG. 10 With reference to FIG. 10, the negative terminal 200 of a battery B' has been formed with a depression 201 therein, and a pin 202 of a nonconducting material, for example plastic, has been inserted in a negative contact 50' of the charger. Pin 202 is adapted to be received in depression 201 such that the negative terminal 200 of battery B' makes an electrical connection with contact 50'. However, if an attempt is made to insert a battery in the charger which does not have a depression of the proper size in its negative terminal, no electrical connection can be made and the battery cannot be charged.

The invention has been described in detail with particular reference to a preferred embodiment thereof, but it will be understood that variations and modifications can be effected within the spirit and scope of the invention.

We claim:

1. A battery charger for charging batteries of different sizes, each of said batteries having a predetermined feature indicative of the electrical characteristics of the battery, said charger comprising:
   support means for receiving batteries in said charger, said support means including a plurality of supports each of which is adapted to receive a battery of a certain size;
   sensing means for sensing when batteries of at least one size are inserted in said charger;
   circuit means for supplying a current to said batteries, said circuit means comprising means for regulating the time that current is supplied to a battery in accordance with whether or not said one size of battery is in the charger;
   contact means for connecting said batteries to said circuit means; and
   means in said charger for preventing batteries not having said predetermined feature from being electrically connected to said contact means.

2. A battery charger for charging a battery having a positive terminal of a predetermined diameter which is indicative of electrical characteristics of the battery, said charger comprising:
   support means for receiving said battery in the charger;
   circuit means for supplying a current to said battery;
   contact means for connecting said battery to said circuit means; and
   means in said charger for preventing batteries not having said positive terminal from being electrically connected to said contact means, said preventing means including a keyway associated with said contact means, and said keyway being sized to receive said positive terminals and to exclude positive terminals having a diameter larger than said predetermined diameter.

3. A battery charger for charging a battery having a negative terminal of a predetermined type which is indicative of electrical characteristics of the battery, said charger comprising:
   support means for receiving said battery in the charger;
   circuit means for supplying a current to said battery;
   contact means for connecting said battery to said circuit means, said contact means including a positive contact and a negative contact; and
   means in said charger for preventing batteries not having said negative terminal from being electrically connected to said contact means, said preventing means including a pin of nonconducting material extending from said negative contact.

4. A battery charger for charging batteries of different sizes, each of said batteries having a predetermined feature indicative of the electrical characteristics of the battery, said charger comprising:
   support means for receiving batteries in said charger, said support means including a plurality of supports each of which is adapted to receive a battery of a certain size;
   circuit means for supplying a current to said batteries, said circuit means comprising a by-pass switch having a slidable element which functions as a negative contact of the charger;
   contact means for connecting said batteries to said circuit means, said contact means including a positive contact; and
   means in said charger for preventing batteries not having said predetermined feature from being electrically connected to said contact means.

5. A battery charger, as defined in claim 4, wherein said slidable element is biased toward the positive contact of the charger.

6. A battery charger for charging batteries of different sizes, each of said batteries having a predetermined feature indicative of the electrical characteristics of the battery, said charger comprising:
   support means for receiving said batteries in said charger, said support means including a location which is adapted to receive batteries of different sizes;
   circuit means for supplying a current to said batteries;
   contact means for connecting said batteries to said circuit means, said contact means including a contact at said location;
   means in said charger for preventing batteries not having said predetermined feature from being electrically connected to said contact means, said preventing means including a first means for preventing batteries of one size from being electrically connected to said contact and a second means for preventing batteries of another size from being electrically connected to said contact, and said first means including a keyway of a first size associated with said contact.

7. A battery charger, as defined in claim 6, wherein said second means includes a keyway of a second size associated with said contact.

* * * * *